US009498007B2

(12) United States Patent
Rizk

(10) Patent No.: US 9,498,007 A0
(45) Date of Patent: Nov. 22, 2016

(54) CHILD'S OUTERWEAR GARMENT

(75) Inventor: Dahlia Rizk, Londonderry, NH (US)

(73) Assignee: Dahlia Rizk, Windham, NH (US)

( * ) Notice: Subject to any disclaimer, the term of this patent is extended or adjusted under 35 U.S.C. 154(b) by 0 days.

(21) Appl. No.: 10/865,705

(22) Filed: Jun. 10, 2004

(65) Prior Publication Data

US 2005/0017566 A1    Jan. 27, 2005

Related U.S. Application Data

(60) Provisional application No. 60/482,728, filed on Jun. 26, 2004.

(51) Int. Cl.
*A47C 31/00* (2006.01)
*A41D 11/00* (2006.01)

(52) U.S. Cl.
CPC ..................................... *A41D 11/00* (2013.01)

(58) Field of Classification Search
USPC .................. 297/465, 464, 463.2; 2/69; 5/482
See application file for complete search history.

(56) References Cited

U.S. PATENT DOCUMENTS

| 4,639,946 | A | * | 2/1987 | Koenig | 297/465 |
| 4,674,800 | A | * | 6/1987 | Ensign | 297/465 |
| 5,429,418 | A | * | 7/1995 | Lipper et al. | 297/465 |
| 6,032,287 | A | * | 3/2000 | Kallas | 2/69 |
| 6,055,686 | A | * | 5/2000 | Knight | 5/494 |
| 6,401,248 | B1 | * | 6/2002 | Christensen | 2/69 |
| 6,817,033 | B2 | * | 11/2004 | Bailey | 2/69.5 |

* cited by examiner

*Primary Examiner* — Laurie K. Cranmer

(57) ABSTRACT

A child's outerwear garment is disclosed that facilitates quickly and properly putting a child into a child's safety car seat and fastening them therein with the seat's restraint system according to NHSTA recommendations. The outerwear garment also facilitates quickly and easily removing a child from the safety seat. The outerwear garment has a rear portion that is worn like a vest but does not cover the chest area of the child so that the belts of the safety seat may be properly positioned and adjusted on the front of a child in the seat without the presence of the front portion. A front portion of the garment is then attached to the rear portion and it helps retain the position of the belts of the safety seat and helps prevent a child from wiggling out of the belts.

16 Claims, 4 Drawing Sheets

CHILD'S OUTERWEAR GARMENT

CROSS REFERENCE TO RELATED APPLICATION

This utility patent application claims rights under 35 U.S.C. 119(e) from U.S. provisional patent application No. 60/482,728 entitled "Child's Outerwear Garment", and filed Jun. 26, 2004.

FIELD OF THE INVENTION

This invention relates to children's garments and, in particular, to a child's outerwear garment designed for maximum safety when used with the restraint belts of a car seat.

BACKGROUND

In 1998, the National Highway and Transportation Safety Administration (NHTSA) reported that every day an average of 7 children die and 866 are injured in automobile crashes. Used correctly, child safety seats are 71% effective in reducing infant deaths and 54% effective in reducing toddler deaths while reducing the need for hospitalization after a crash by 69%. A study in 1996 determined that 62% of the child restraint systems examined were found to be used incorrectly. Specifically, (1) the restraint system was improperly secured to the vehicle, or (2) the child was improperly secured in the child restraint, or (3) both errors occurred.

Incorrect use of the child's car seat has been a growing focus of the NHSTA, to the extent that the automobile industry was asked to comply to new regulations that required every passenger car made after September of 2002 to have a LATCH system whereby the car seat can be placed in the car without any fear of improper attachment of the car seat to the car. The remaining problem with improper car seat restraint is now that of unsafe harness use. In fact, misuse of restraints was observed in 79.5% of the systems studied. According to the NHTSA, for the harness to protect a child properly, the straps should be routed over the child's shoulders and pulled tight over the chest with only enough room for one adult sized finger to fit between the strap and the chest. This poses a problem in the winter, when, bulky outerwear makes it impossible to achieve the degree of tightness in the harness necessary for the child to be safe.

To solve this problem, the NHSTA recommends that parents remove bulky outerwear before putting children and infants in their car seats and using a blanket to keep them warm. This recommendation is highly impractical. First, it is sometimes difficult to get children into outerwear to begin with, as children are often resistant to the process. Further, a typical trip taken by a parent with a child might require multiple stops (e.g. at the store, the bank, the dry cleaners, etc). It is complicated enough to buckle children in and out of car seats multiple times, but adding the time and effort required to also repeatedly bundle children in, and out of outerwear as well would make such trips prohibitive. There is also a high likelihood that a child will get chilled during the time when the outerwear is being removed and the car seat buckled, as well as of the child either not being willing to use the prescribed blanket to stay warm during travel or losing the blanket and not being able to retrieve it (making it necessary for the driver to stop the car in order to retrieve it). The likely result of such problems is the continued misuse of harness straps.

What has been needed, therefore, is a child's outerwear garment that can be used safely with a car seat harness system while retaining convenience of use and the ability to keep the child warm at all times.

OBJECTS OF THE INVENTION

Accordingly, an object of the present invention is to provide a child's outerwear garment that will allow use of the garment in conjunction with a car seat in a manner that is both safe and convenient.

A particular object of the invention is to provide a child's outerwear garment that will allow parents to correctly secure and fit a car seat harness belt across a child's or infant's chest and lap, thus securing the child properly to the restraint system.

A further particular object of the present invention is to provide an outerwear garment that makes it possible to correctly use a car seat harness system without removing the outerwear garment completely.

Yet another particular object of the present invention is to provide an outer wear garment that allows correct use of a car seat harness system without the child getting cold.

BRIEF DESCRIPTION OF THE DRAWINGS

FIG. 1b is a front view of the rear portion of a child's outerwear garment according to the preferred embodiment of the invention shown in FIG. 1a;

FIG. 1c is a front view of the front panel of a child's outerwear garment according to the preferred embodiment of the invention shown in FIG. 1a;

DETAILED DESCRIPTION

Figure 1A:
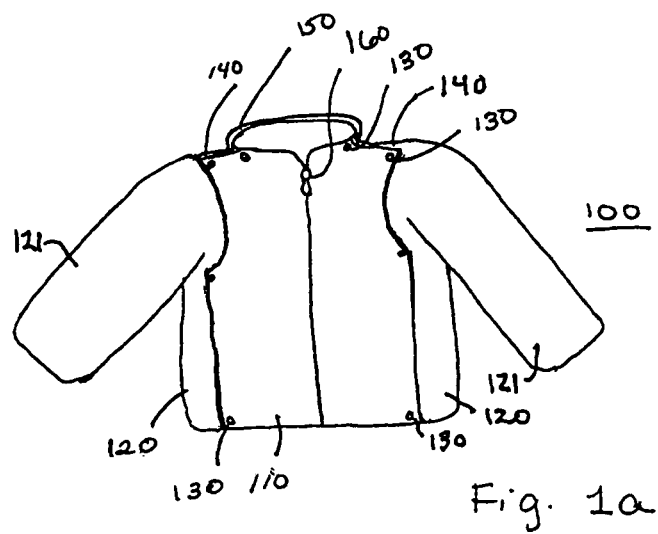
FIG. 1a is front view of a child's outerwear garment according to a preferred embodiment of the present invention.
Figure 1B:
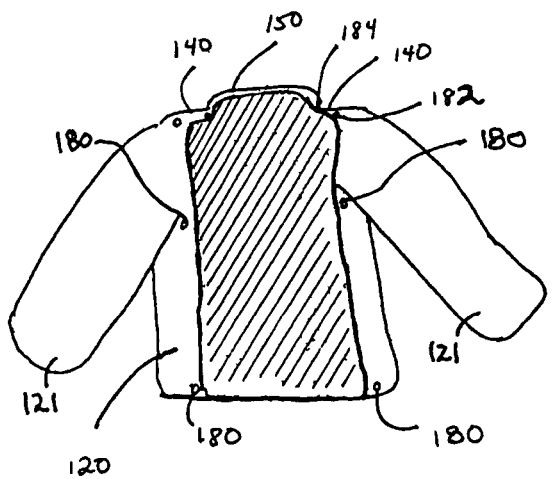
Figure 1C:
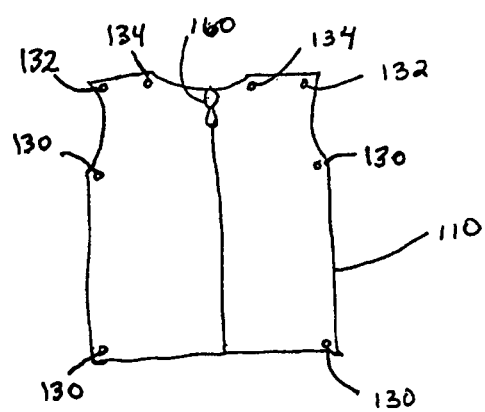
Figure 2:
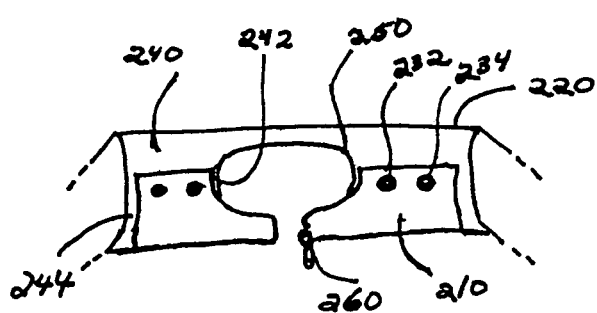
FIG. 2 is a top view of a child's outerwear garment according to the preferred embodiment of the present invention.

In the following detailed description element numbers are assigned as per the following examples. The outwear garment has a front panel that is designated 110 in FIGS. 1a–1c, is designated 210 in FIG. 2, is designated 410 in FIG. 4 and so on. There is a rear portion that is designated 120 in FIGS. 1a–1c, is designated 220 in FIG. 2, is designated 320 in FIG. 3 and so on. When the second and third digits are the same they represent the same element.

The present invention is a child's outerwear garment that can be used safely with a car seat harness system. The garment is comprised of a rear portion that covers the child's back and arms and a front panel that is detachable along the shoulders and sides. The front panel is secured to the rear portion by any type of fastener known in the art including, but not limited to, clasps, hooks, snaps, buttons, zippers, Velcro™, or any combination thereof. The garment is made from any material suitable for use in outerwear garments including, but not limited to, water-resistant or waterproof nylon or polyester, fleece, wool, cotton, and combinations thereof. It may optionally include a lining made of any suitable material, and may further optionally be filled with any of the many types of filling materials known in the art including, but not limited to, down, feathers, polyester, Thinsulate™ or combinations thereof. It may be fabricated using any of the many methods known in the art for garment construction, or combinations thereof.

The invention is suitable for use with all commonly used car seat restraint systems including, but not limited to, 3-point harnesses, 5-point harnesses, overhead shields, and T-shields. By providing for the removal of the bulky front portion of the child's garment, the present invention makes it possible for a parent to position a car seat's harness safety belts within the guidelines mandated by the National Highway and Transportation Safety Administration (NHTSA).

FIG. 1a is a front view of a child's outerwear garment 100 according to an embodiment of the present invention. In the embodiment of FIG. 1a, detachable front panel 110 is attached to rear portion 120 of garment 100 by fasteners 130. Fasteners 130 may be any fastener known in the art including, but not limited to, clasps, hooks, snaps, buttons, zippers, Velcro™, or any combination thereof. It is particularly important to the present invention that front panel 110 be detachable from rear portion 120 high up on the shoulders 140 of garment 100, in order that the advantages of the invention may be fully realized. It is removal of front panel 110 all the way to shoulders 140 that allows a car seat harness to be properly and safely secured over a child wearing garment 100, as this removal prevents the puffing and bunching at the shoulder that prevents the car seat harness from being properly and safely used with conventional outwear garments.

The rear portion 120 of garment 110 is shown as having sleeves 121 which are not critical to the present invention. When garment 100 is used in the winter sleeves 121 are useful for warmth, but may be dispensed with in the summer.

Garment 100 as shown in FIG. 1 further has an optional collar 150 and center fastener 160. Optional center fastener 160 may be any type of fastener known in the art including, but not limited to, clasps, hooks, snaps, buttons, zippers, Velcro™, or any combination thereof. Use or non-use of optional collar 150 and center fastener 160 is a decision based on comfort, style, and utility of the outerwear garment; and such use or non-use does not affect the utility of the present invention.

FIG. 1b is a front view of the rear portion 120 of the child's outerwear garment according to the preferred embodiment shown in FIG. 1a with front panel 110 removed. The parallel lines represent the inside of the rear portion 120. In FIG. 1b, rear portion 120 has fasteners 180, 182 and 184 suitable for mating with fasteners 130 on front panel 110 of FIG. 1a. Fasteners 180, 182 and 184 may be any fastener known in the art including, but not limited to, clasps, hooks, snaps, buttons, zippers, Velcro™, or any combination thereof. As shown in FIG. 1b, fasteners 182 and 184 are at the shoulder 140 of rear portion 120, which is important for properly securing front panel 110 of FIG. 1a when front panel 110 is in use. As previously emphasized, it is removal of front panel 110 all the way to shoulders 140 that allows a car seat harness to be properly and safely secured over a child wearing garment 100. Rear portion 120 as shown in FIG. 1b further has optional collar 150. Use or non-use of optional collar 150 is a decision based on comfort, style, and utility of the outerwear garment; and such use or non-use does not affect the utility of the present invention.

FIG. 1c is a front view of the front panel 110 of the child's outerwear garment 100 according to the embodiment shown FIG. 1a. In the embodiment of FIG. 1c, front panel 110 has fasteners 130, 132 and 134 suitable for mating with respective fasteners 180, 182 and 184 of FIG. 1b. Fasteners 130, 132 and 134 may be any fastener known in the art including, but not limited to, clasps, hooks, snaps, buttons, zippers, Velcro™, or any combination thereof. As shown in FIG. 1c, fasteners 132 and 134 are designed to secure front panel 110 to the shoulder 140 of rear portion 120 shown in FIG. 1b, which is important for properly securing front panel 110 when it is in use. Front panel 110 as shown in FIG. 1c further may have an optional center fastener 160. Optional center fastener 160 maybe any type of fastener known in the art including, but not limited to, clasps, hooks, snaps, buttons, zippers, Velcro™, or any combination thereof. Fastener 160 may be used to open the front of front panel 110 after it is attached to rear portion 120 if a child wearing garment 110 is too hot, or to perform additional adjustments to the restraining belts of the safety seat harness. Use or non-use of optional center fastener 160 is a decision based on comfort, style, and utility of the outerwear garment; such use or non-use does not affect the utility of the present invention.

FIG. 2 is a top view of a child's outerwear garment according to the preferred embodiment of the present invention. In the embodiment shown in FIG. 2, detachable front panel 210 is attached to rear portion 220 of the garment at shoulders 240 by fasteners 232 and 234 on either shoulder. Fasteners 232 and 234 may be any fastener known in the art including, but not limited to, clasps, hooks, snaps, buttons, zippers, Velcro™, or any combination thereof. It is particularly important to the present invention that front parcel 210 be detachable from rear portion 220 high up on the shoulders 240 of the garment, in order that the advantages of the invention may be fully realized. In FIG. 2, inner attachment area 242 and outer attachment area 244 of rear portion 220 are shown as extending from beneath attached front panel 210.

As shown in FIG. 2, the garment further has optional collar 250 and center fastener 260. Optional center fastener 260 may be any type of fastener known in the art including, but not limited to, clasps, hooks, snaps, buttons, zippers, Velcro™, or any combination thereof. Use or non-use of optional collar 250 and center fastener 260 is a decision based on comfort, style, and utility of the outerwear garment; such use or non-use does not affect the utility of the present invention.

Figure 3:
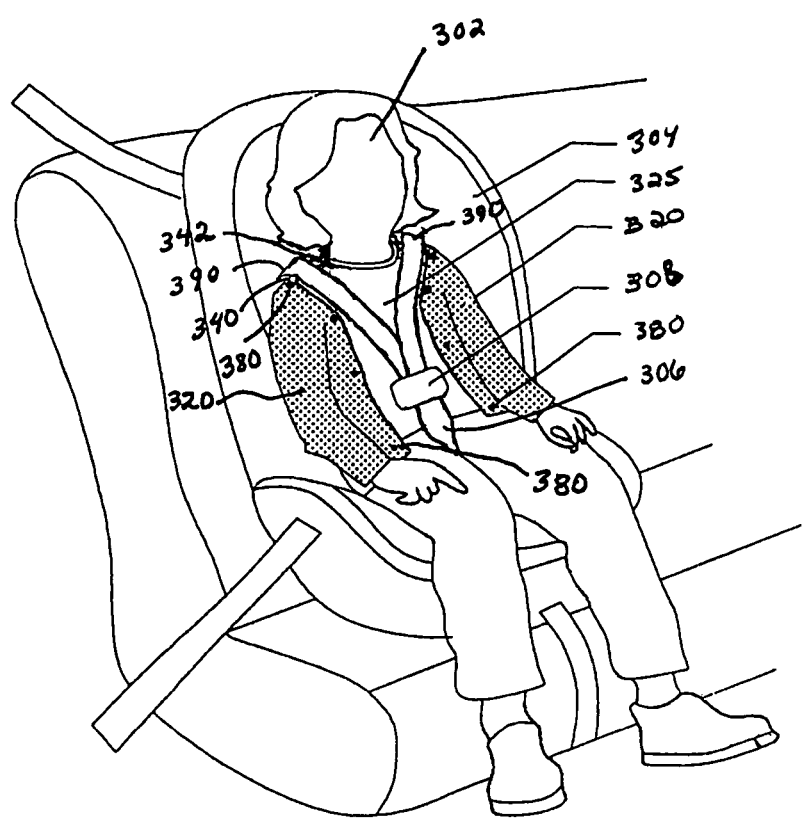
FIG. 3 is a view of a child in a typical car seat restraint system wearing a child's outerwear garment according to the preferred embodiment of the present invention.

FIG. 3 is a view of a child in a typical car seat restraint system wearing a child's outerwear garment 310 according to the preferred embodiment of the present invention. As shown in FIG. 3, a child 302 is restrained in a typical car seat 304 by 3-point harness 306 so that buckle 308 lays flat against the child's chest with only enough room for one adult sized finger to fit between the buckle and the chest. While a 3-point harness is illustrated in FIG. 3, the invention may be advantageously used with any form of car seat harness or car seat known in the art. In FIG. 3 child 302 is shown wearing only rear portion 320 of an outerwear garment according to the present invention over a shirt 325. As shown, the front panel of the garment has been detached from the garment by the detaching fasteners 380.

As illustrated in FIG. 3, car seat harness 306 lies only over the child's shirt 325, rather than over rear portion 320 of the outerwear garment. This eliminates the problem of the bulky outerwear garment preventing tightening of car seat harness 306 to the standard specified by the NHTSA. This advantage is made possible by the construction of shoulder 340 of rear portion 320, which is cut so as to minimize contact between car seat harness 306 and shoulder 340. As shown, the tops 390 of car seat harness 306 leave car seat 304 and begin contact with child 302 just below inner attachment area 342 of shoulder 340. This configuration prevents the puffing and bunching at the shoulder that prevents a car seat harness from being properly and safely used with conventional outerwear garments.

A further advantage of the present invention is that the front panel of the garment may be re-attached to rear parcel 320 by means of fasteners 380 once car seat harness 306 is secured. This allows exposure of the child to cold temperatures to be minimized, and eliminates the problem of the child refusing to use or otherwise losing a blanket or other means provided for warmth. In addition, when the front portion is attached to the rear portion it helps retain the position of the belts of the safety seat and helps prevent a child from wiggling out of the belts.

Figure 4:
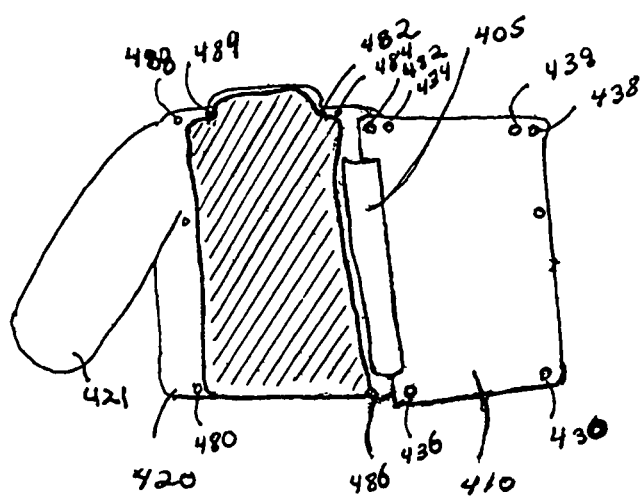
FIG. 4 is a view of a child's outerwear garment having an attachment panel between the front panel and rear portion that may be used with the garment.

FIG. 4 is a view of a child's outerwear garment having an attachment panel 405 between the front panel 410 and rear portion 420 according to an alternative embodiment of the present invention. In the embodiment shown in FIG. 4, optional attachment panel 405 connects one side of the back of front panel 410 to one side of the front of rear portion 420. Attachment panel 405 provides the advantage that it prevents front panel 410 from being completely separated from rear portion 420, thereby preventing potential loss of front panel 410 during non-use or through deliberate or accidental removal by the child when the garment is being worn.

In FIG. 4, front panel 410 is attached to rear portion 420 but is being viewed from the rear. The parallel lines represent the inside of the rear portion 120. In this configuration, when front panel 410 is attached to rear portion 420, the back of fastener 430 (shown) mates with fastener 480 and the back of fastener 436 (shown) mates with fastener 486. Similarly, the back of fastener 432 (shown) mates with fastener 482, the back of fastener 434 (shown) mates with fastener 484, the back of fastener 438 (shown) mates with fastener 488 and the back of fastener 439 (shown) mates with fastener 489. As before, fasteners 430, 432, 434, 436, 438, 439, 480, 482, 484, 486, 488, 489 may be any fastener known run the art including, but not limited to, clasps, hooks, snaps, buttons, zippers, Velcro™, or any combination thereof.

In this embodiment of the invention, attachment panel 405 is attached slightly inward from the outer edges of front panel 410 and rear portion 420, allowing attachment panel 405 to be pulled neatly and completely out of the way of the car seat harness straps. This configuration allows attachment panel 405 to fold neatly between front panel 410 and rear portion 420 when front panel 410 is attached to rear portion 420 with fasteners 430, 432, 434, 436, 438, 439, 480, 482, 484, 486, 488 and 489, presenting a neat appearance while the garment is being worn. Attachment panel 405 is comprised of a relatively sturdy yet thin material, such as water-resistant or waterproof nylon or polyester, so that it does not present too much bulk when folded between front panel 410 and rear portion 420. However, attachment panel 405 may be fabricated of any suitable material including, but not limited to, water-resistant or waterproof nylon or polyester, fleece, wool, cotton, elasticized materials, and combinations thereof.

Figure 5:
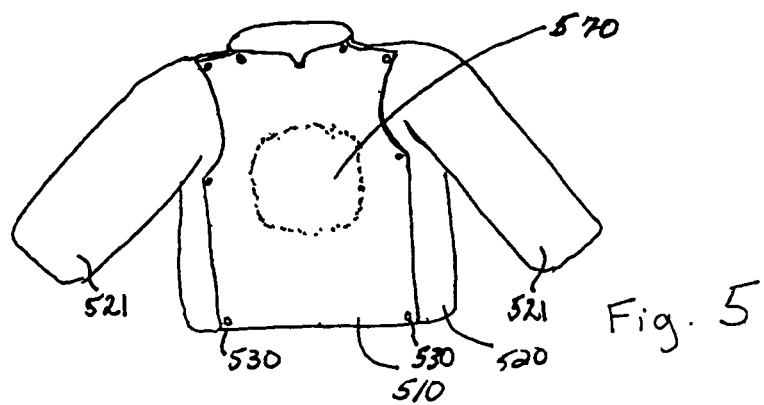
FIG. 5 is a front view of a child's outerwear garment having a decorative element on the front panel.

FIG. 5 is a front view of a child's outerwear garment having a decorative front panel 510 according to another embodiment of the present invention. In the embodiment shown in FIG. 5, detachable front panel 510 is shown attached to rear portion 520 of garment 100 by fasteners 530. In this embodiment, there is no center fastener. This embodiment is particularly suitable for adding an optional, decorative element 570, such as a school or team; logo, cartoon, television, or movie character, motto, or any other suitable decorative device known in the art. As shown, optional decorative effect 570 is positioned in the middle of front panel 510. Optional decorative effect 570 may of course be any size or shape suitable for use with the garment, and may optionally extend beyond front panel 510 onto rear portion 520. While this embodiment is particularly suited for use with an optional decorative effect, any embodiment of the invention may advantageously employ such an effect. Use or non-use of optional, decorative effect 570 is a decision based on comfort, style, and utility of the outerwear garment; such use or non-use does not affect the utility of the present invention.

The present invention, therefore, provides a child's outerwear garment that allow use of the garment in conjunction with a car seat in a manner that is both safe and convenient, allowing parents to correctly secure and fit a car seat harness belt across a child's or infant's chest and lap, thus securing the child properly to the restraint system. This child's outerwear garment makes it possible to correctly use a car seat harness system without removing the outerwear garment completely and without the child getting cold. Each of the embodiments of the invention described above may be combined with any of the other embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. An outer garment to be worn by a child to facilitate their being easily and properly fastened into and removed from an automobile safety seat, the safety seat having restraint belts and that pass over the shoulders of a child in the seat and are fastened with other belts of the seat in the center of the child's chest, the garment comprising:

a rear portion that is worn like a vest but does not cover all of the chest area of a child wearing the garment; and a front portion that is attached to the rear portion of the garment after the child is fastened into the safety seat using the restraint belts of the seat; the front portion covering the belts and fastener in the center of the child's chest after the front portion is attached to the rear portion;

wherein the restraint belts of the seat may be properly positioned and adjusted on the front of a child in the safety seat without the presence of the front portion of the garment.

2. The outer garment in accordance with claim 1 wherein the shoulder region of the rear portion is shaped so that it does not interfere with restraint belts of the safety seat that pass over the shoulders of a child in the safety seat.

3. The outer garment in accordance with claim 2 further comprising means that connects both the front panel and the rear panel to keep them from being separated from each other when they are not attached to each other as described in claim 1.

4. The outer garment in accordance with claim 3 wherein the rear portion of the garment has a collar region and further comprising a collar around the collar region.

5. The outer garment in accordance with claim 4 wherein the front portion and the rear portion of the garment may be lined with an insulating material for use when it is cold.

6. The outer garment in accordance with claim 5 further comprising fastening means for attaching the front portion to the rear portion of the garment.

7. The outer garment in accordance with claim 1 wherein when the front portion is attached to the rear portion it helps retain the position of the belts of the safety seat and helps prevent a child from wiggling out of the belts.

8. The outer garment in accordance with claim 7 wherein the shoulder region of the rear portion is shaped so that it does not interfere with restraint belts of the safety seat that pass over the shoulders of a child in the safety seat.

9. The outer garment in accordance with claim 1 further comprising means that connects both the front panel and the rear panel to keep them from being separated from each other when they are not attached to each other as described in claim 1.

10. The outer garment in accordance with claim 9 wherein when the front portion is attached to the rear portion it helps retain the position of the belts of the safety seat and helps prevent a child from wiggling out of the belts.

11. An outer garment worn by a child that facilitates their being easily and properly fastened into and removed from an automobile safety seat that has restraint belts that pass over the shoulders of a child in the seat and are fastened with other belts of the safety seat in the center of the child's chest, the garment comprising:

a rear portion that is worn by a child like a vest; and a front portion that is attached to the rear portion of the garment after the child is fastened into the safety seat using the restraint belts of the safety seat; the front portion covering the belts and fastener in the center of the child's chest after the front portion is attached to the rear portion;

wherein the restraint belts of the safety seat may be properly positioned and adjusted on the front of a child in the safety seat without the presence of the front portion, and wherein when the front portion is attached to the rear portion it helps retain the position of the belts of the safety seat and helps prevent a child from wiggling out of the belts.

12. The outer garment in accordance with claim 11 wherein the shoulder region of the rear portion is shaped so that it does not interfere with restraint belts of the safety seat that pass over the shoulders of a child in the safety seat.

13. The outer garment in accordance with claim 11 wherein the shoulder region of the rear portion is shaped so that it does not interfere with restraint belts of the safety seat that pass over the shoulders of a child in the safety seat.

14. The outer garment in accordance with claim 11 further comprising means that connects both the front panel and the rear panel to keep them from being separated from each other when they are not attached to each other.

15. The outer garment in accordance with claim 14 wherein the front portion and the rear portion of the garment may be lined with an insulating material for use when it is cold.

16. The outer garment in accordance with claim 15 further comprising fastening means for attaching the front portion to the rear portion of the garment.

* * * * *